(No Model.)
J. B. BAKER.
MACHINE FOR SILKING GREEN CORN.
No. 316,864. Patented Apr. 28, 1885.
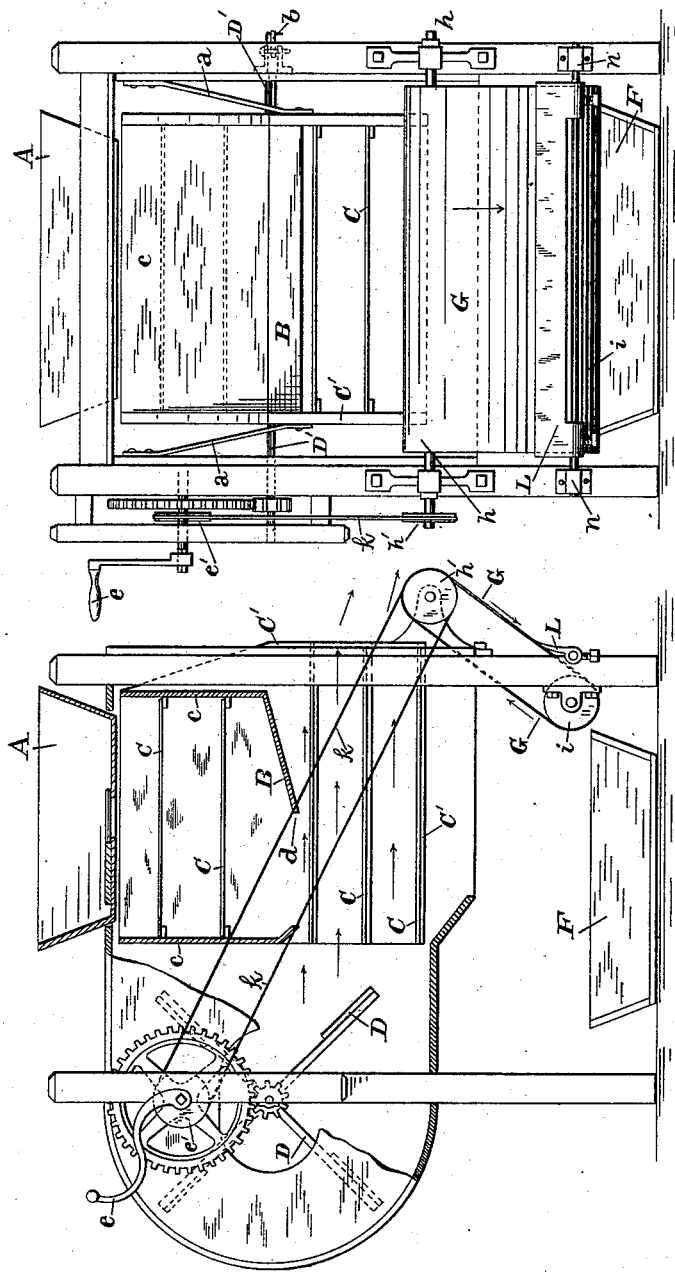
WITNESSES:
Edward A. Osse,
John E. Morris
INVENTOR:
James B. Baker
By Chas B. Mann
Attorney.

UNITED STATES PATENT OFFICE.

JAMES B. BAKER, OF ABERDEEN, MARYLAND.

MACHINE FOR SILKING GREEN CORN.

SPECIFICATION forming part of Letters Patent No. 316,864, dated April 28, 1885.

Application filed January 16, 1885. (No model.)

*To all whom it may concern:*

Be it known that I, JAMES B. BAKER, a citizen of the United States, residing at Aberdeen, in the county of Harford and State of Maryland, have invented certain new and useful Improvements in Machines for Silking Green Corn, of which the following is a specification.

My invention has for its object to provide an improved machine for removing the silk from green corn after it is cut from the cob.

In many packing-houses where green corn is canned it has been the practice heretofore, after the corn has been husked, to remove the silk adhering to the kernels on the cob by means of a brush applied to the husked ear by the hand of the husker, after which the kernels are cut from the cob. Mechanical contrivances have also been employed to separate the silk mingled in among the cut kernels; but all such devices hitherto used, so far as my knowledge goes, have been unsatisfactory and operated imperfectly. I contemplate that the husks shall be removed as usual, and with them all that part of the silk which readily detaches. The silk which adheres to the ear between the rows of kernels, instead of being brushed off, will be removed or got rid of, as hereinafter described, after the kernels have been cut from the cob. The corn is first husked and then cut from the cob, as usual. The mass of cut kernels containing the silk is then placed in the hopper of the improved machine, by which the kernels are separated and subjected to a blast of air, which removes the silk, thus accomplishing the prime object; and as the loose hulls are at the same time removed a secondary result is also effected.

In the accompanying drawings, Figure 1 is a side elevation of the machine, one side being partly removed, showing some of the parts in section. Fig. 2 is an end elevation of the machine.

The machine, as regards the hopper or box A, inclined board B below it, screens C, and fan-blower D, resembles a fanning-mill; but I have adapted these well-known parts to serve the purpose of silking and removing the hulls from green corn by combining with them certain additional parts now to be described. The screens C are in a shaking frame, C', which is supported by loose or spring hangers, a, at each side, and is vibrated sidewise by a reciprocating rod on one side of the machine, which is connected to the shaking frame by the bell-crank lever b. The other end of the rod is attached to a crank on the shaft D' of the rotary fan; and by this well-known means the screen-frame is shaken. The two upper screens are inclosed on all four vertical sides, c, and after passing through these the corn-kernels, in a separated condition, are delivered onto the inclined board B, down which the kernels and such silk as may be mingled with them will flow and fall from the lower edge, d, in a thin broad stream. When the crank e is turned, the rotating fan-blower D will produce a blast of air (indicated by the arrows) directed below the inclined board B, which blast will play against the thin broad stream of kernels falling from the inclined board. The kernels will then pass down through the three lower screens. The air-blast meanwhile passing across and between these screens will continue to play against the kernels and blow out the small pieces of silk and hulls. The air-blast has the effect to drive the falling kernels toward the rear of the machine, and many of them will pass over the rear edge of the screens. To receive all such kernels and direct them into the receptacle F, placed below the screens, an inclined surface is provided, whose uppermost part has position beyond the rear end of the screens, and whose lowermost part is below the screens and over the said receptacle; but it is important that the inclined surface shall not become obstructed by the lodgment thereon of silk and hulls, as in this event the kernels would not roll down the incline. To meet these requirements the inclined surface consists of an endless apron or belt, G, mounted on two rollers, h and i, at the rear end of the machine. The position of these rollers gives the desired inclination to the apron. A pulley, h', is on the shaft of the upper roller, and a cord or belt, k, connects this pulley with another pulley, e', on the crank-shaft. By this means motion is imparted to the rollers, and the upper inclined surface of the endless apron moves up, as indicated by the arrow. A scraper, L, consisting of a blade with a thin or beveled edge, is mounted in bearings n, and has position on the outer side of and below the apron. The beveled edge of the scraper is uppermost and bears against the apron, and serves to remove therefrom all adhering particles of silk, chaff, and hulls which may have been lodged thereon by the air-blast, and thereby the inclined surface is kept clear for the kernels.

Having described my invention, I claim and desire to secure by Letters Patent of the United States—

A machine for silking green corn after it has been cut from the cob, comprising the upper screens with the inclosing sides $c\ c$, an inclined board, B, below the upper screens, a fan-blower at the front end of the machine, for directing an air-blast below the inclined board, the lower screens arranged for the air-blast to pass across and between them, an endless apron, G, and rollers $h\ i$ at the rear end of the machine, as set forth.

In testimony whereof I affix my signature in presence of two witnesses.

JAMES B. BAKER.

Witnesses:
WM. B. NELSON,
JOHN E. MORRIS.